United States Patent
Erdmann et al.

(10) Patent No.: US 10,165,076 B2
(45) Date of Patent: Dec. 25, 2018

(54) NETWORK SYSTEM, A LIGHTING SYSTEM, AND A METHOD OF CACHING INFORMATION FROM A RESOURCE-CONSTRAINED DEVICE

(71) Applicant: PHILIPS LIGHTING HOLDING B.V., Eindhoven (NL)

(72) Inventors: Bozena Erdmann, Aachen (DE); Esko Olavi Dijk, Utrecht (NL); Xiaoming Zhou, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 197 days.

(21) Appl. No.: 14/892,858

(22) PCT Filed: May 7, 2014

(86) PCT No.: PCT/EP2014/059389
§ 371 (c)(1),
(2) Date: Nov. 20, 2015

(87) PCT Pub. No.: WO2014/187672
PCT Pub. Date: Nov. 27, 2014

(65) Prior Publication Data
US 2016/0100028 A1   Apr. 7, 2016

(30) Foreign Application Priority Data
May 21, 2013   (EP) ..................... 13168480

(51) Int. Cl.
*H04L 29/08*     (2006.01)
*G08C 17/00*     (2006.01)
(Continued)

(52) U.S. Cl.
CPC .......... *H04L 67/2842* (2013.01); *G08C 17/00* (2013.01); *G08C 19/00* (2013.01);
(Continued)

(58) Field of Classification Search
CPC .......... G06F 12/0862; G06F 17/30091; G06F 9/5016; H04L 41/0803; H04L 47/10;
(Continued)

(56) References Cited

U.S. PATENT DOCUMENTS 7,139,268 B1 * 11/2006 Bhagwat ................. H04L 47/10
370/389
2004/0162871 A1 * 8/2004 Pabla .................... H04W 8/005
709/201
(Continued)

FOREIGN PATENT DOCUMENTS

CN        101420805 A     4/2009
EP        2228965 A1      9/2010
(Continued)

OTHER PUBLICATIONS

Niesen, Urs, et al., "Caching in Wireless Networks," Dec. 29, 2011 (28 pages).
(Continued)

*Primary Examiner* — Le H Luu
(74) *Attorney, Agent, or Firm* — Meenakshy Chakravorty

(57) ABSTRACT

A network system (100) for and a method of caching information from a resource-constrained device are provided. A resource-constrained device (110) provides via a network (130) generated data (d) that relates to a status of the resource-constrained device (110) to a controllable device (150) for controlling the controllable device (150). The controllable device (150) controls an operation of an operational component (154) in response to receiving the data (d). The controllable device (150) also comprises a cache memory (156) in which the received data (d) is stored and the controllable device (150) is configured to receive from a requesting device (170) a request (r) for the stored data (d) and is configured to provide the stored data (d) to the requesting device (170). The network system (100) provides
(Continued)

a caching solution for the data (d) which is more transparent for the resource-constrained device (110).

19 Claims, 6 Drawing Sheets

(51) Int. Cl.
    *G08C 19/00*     (2006.01)
    *H05B 37/02*     (2006.01)
    *H04L 12/28*     (2006.01)

(52) U.S. Cl.
    CPC ..... *H04L 12/2823* (2013.01); *H05B 37/0227* (2013.01); *H05B 37/0272* (2013.01); *G08C 2201/12* (2013.01); *H04L 2012/285* (2013.01)

(58) Field of Classification Search
    CPC . H04L 63/0245; H04L 63/0281; H04L 67/06; H04L 67/2842; H04L 12/2823; H04L 2012/285; H04W 4/02; H04W 8/005; H05B 37/0272; H05B 37/0227; G08C 17/00; G08C 19/00; G08C 2201/12
    See application file for complete search history.

(56) References Cited

U.S. PATENT DOCUMENTS

| | | | |
|---|---|---|---|
| 2005/0102300 A1 | 5/2005 | Madsen | |
| 2007/0243821 A1 | 10/2007 | Hundscheidt et al. | |
| 2008/0120414 A1 | 5/2008 | Kushalnagar et al. | |
| 2009/0312033 A1* | 12/2009 | Shen | H04W 4/02 455/456.1 |
| 2010/0223462 A1* | 9/2010 | Do | H04L 67/06 713/165 |
| 2010/0306528 A1* | 12/2010 | Andress | H04L 63/0281 713/153 |
| 2011/0225368 A1* | 9/2011 | Burge, III | G06F 12/0862 711/118 |
| 2012/0047361 A1 | 2/2012 | Erdmann et al. | |
| 2012/0151028 A1 | 6/2012 | Lu et al. | |
| 2012/0246226 A1* | 9/2012 | Anandam | H04L 67/06 709/203 |
| 2012/0254116 A1* | 10/2012 | Thereska | G06F 17/30091 707/640 |
| 2013/0166669 A1* | 6/2013 | Luna | G06F 9/5016 709/212 |
| 2013/0339472 A1* | 12/2013 | Ruellan | H04L 67/2842 709/214 |
| 2013/0347094 A1* | 12/2013 | Bettini | H04L 63/0245 726/11 |
| 2014/0258347 A1* | 9/2014 | Laughlin | G06F 17/30091 707/824 |
| 2014/0269414 A1* | 9/2014 | Hyde | H04L 41/0803 370/254 |

FOREIGN PATENT DOCUMENTS

| | | |
|---|---|---|
| JP | 2002112363 A | 4/2002 |
| WO | 2012060995 A2 | 5/2012 |

OTHER PUBLICATIONS

Rathod, B. Rajkumar, et al., "Distributed Cooperative Caching Strategies in Wireless Ad Hoc Networks," International Journal of Computer Applications (0975-8887), vol. 57, No. 10., Nov. 2012 (6 pages).

\* cited by examiner

NETWORK SYSTEM, A LIGHTING SYSTEM, AND A METHOD OF CACHING INFORMATION FROM A RESOURCE-CONSTRAINED DEVICE

CROSS-REFERENCE TO PRIOR APPLICATINS

This application is the U.S. National Phase application under 35 U.S.C. § 371 of International Application No. PCT/EP2014/059389, filed on May 7, 2014 which claims the benefit of European Patent Application No. EP 13168480.5, filed on May 21, 2013. These applications are hereby incorporated by reference herein.

FIELD OF THE INVENTION

The invention relates to network systems with at least one resource-constrained device and comprises a data caching solution. The invention further relates to a lighting system comprising a network system. And the invention relates to a method of caching information from a resource-constrained device.

BACKGROUND OF THE INVENTION

Resource-constrained devices are widely used in automation and control networks, for example, as battery-powered or even energy-harvesting controllers or sensors. Due to their limitations, for example, in terms of power, resulting in limitations in the available processing, reception and transmission time, the resource-constrained devices require a specific control solution to fulfill their role in the system.

There are dedicated protocols for handling such constrained devices, e.g. the solutions provided by the company EnOcean; there are also solutions becoming integrated into standard control technologies, such as the Green Power feature developed by ZigBee.

A resource-constrained device that has its radio inactive for substantial periods of time (such that no radio frame reception is possible during each period) is called a "sleepy" device. During such periods the device is said to be "sleeping" or "asleep".

Typically, when a device sends a request to a resource-constrained device to obtain information, the message is not answered during the period in which the resource-constrained device is "sleeping". Thus, the requesting device might have to send several requests before an answer with the requested information arrives at the requesting device. This is undesirable because it leads to a waste of processing and network resources and might even lead to congestion in the network via which the resource-constrained device communicates with other devices.

Published patent application US2012/0151028 provides a solution for this problem. In the network of the cited patent application, the "constrained devices", which are devices that are in a "sleeping" mode on a regular basis, send their sleep and wake-up schedule to a non-constrained device in the network, which is, for example, an edge router of a low-power wireless network, and the non-constrained device may use the sleep and wake-up schedule for different purposes. For example, when a requesting device sends a message to the constrained device, the non-constrained device may temporarily cache the request and forward the request at the moment when the constrained device should be woken up according to the schedule. This particular solution has as a disadvantage that the requesting device still has to wait for an answer up to the moment in time that the constrained device wakes up.

Published patent application US2008/0120414 provides a solution in which resource-constrained devices provide their data values (e.g. values measured by their sensor) to an access point which is a non-constrained device and which is in contact with the resource-constrained device and another network (e.g. a wired network). The access point processes the received data values and stores the processed data. Another device may request the processed data from the access point. In this solution, the access point forms a sort of cache for data that is based on data that is provided by the resource-constrained device. The main goal of such a solution is that the resource-constrained device saves as much power as possible by entering the sleeping mode as much as possible, while another device is available to provide requested data as soon as possible. Unfortunately, this solution is not transparent for the resource-constrained device and the requesting device. Both devices need to know the address of the access point (cache) and, thus, they must learn the address of the access point. A further disadvantage is that the access point needs to be a powerful device which has a relatively large communication bandwidth; the access point is a centralized unit which receives data from many resource constrained devices and which has to answer requests from many requesting devices.

SUMMARY OF THE INVENTION

It is an object of the invention to provide a more transparent caching solution for caching data of a resource-constrained device which operates in a relatively energy-efficient manner.

A first aspect of the invention provides a network system for caching information from a resource-constrained device. A second aspect of the invention provides a lighting system. A third aspect of the invention provides a method of caching information from a resource-constrained device in a network system. Advantageous embodiments are defined in the dependent claims.

A network system in accordance with the first aspect of the invention comprises a controllable device, a resource-constrained device and a network. The controllable device comprises a first communication interface and an operational component for performing a specific action on the basis of received data. The controllable device is configured to receive the data via the first communication interface and to adapt the operation of the operational component in response to the received data. The resource-constrained device comprises a second communication interface and a data generator. The data generator generates data that relates to a status of the resource-constrained device. The resource-constrained device is configured to transmit the data via the second communication interface to the controllable device for controlling the operation of the controllable device. The network interconnects the controllable device and the resource-constrained device and transmits the data between the respective first and second communication interfaces. The controllable device further comprises a cache memory in which the data received from the resource-constrained device is stored. The controllable device is configured to receive a request for the data stored in the cache memory from a requesting device and provides the data to the requesting device in response to receiving such a request.

The network system, in particular, relates to networks in which a resource-constrained device is used to control a controllable device. The resource-constrained device might be a sensor or a controller, e.g. a switch or a remote control, and in response to sensed information or control input at a user-operable control element of the resource-constrained device, the controllable device has to perform a specific operation. A typical use case is a lighting system in which a light emitter must start the emission of light when an occupancy sensor senses the presence of people in a space that is illuminated by the light emitter. Another typical use case is a lighting system in which a light emitter must start/stop/dim its emission of light when a switch is operated by the user in a space that is illuminated by the light emitter. The controllable device is not in particular limited with respect to resources and might be connected to an (unlimited) energy source, while the resource-constrained device is, for example, limited with respect to the available amount of energy.

In such a network system, the resource-constrained device transmits, according to a specific protocol, data which relates to its status (e.g. the sensor data or data received via an input means) to the controllable device to control the operation of the controllable device. In order to perform the controlling operation, at least one of the controllable device and the resource-constrained device learns which device is to be controlled or which device will provide control data. Once this knowledge is present in at least one of the devices (and in combination with a specific data transmission protocol used on the network and/or by the resource-constrained device) the resource-constrained device is capable of controlling the controllable device. It might be that specific (requesting) devices also want to request for the data that relates to the status of the resource-constrained device. For example, in a building management system it might be that a central server wants to know from an occupancy sensor what the occupancy sensor senses in the specific space which it is monitoring.

According to the invention, the controllable device also stores the data provided by the resource-constrained device in a cache memory and the controllable device is adapted to answer requests for this data. Thus, the resource-constrained device does not need to have any knowledge about the existence of the cache and the resource-constrained device only performs the actions that it has been configured for: send data to the controllable device which it has to control. Thus, for the resource-constrained device, the use of the cache is completely transparent. It might be, for example, that the requesting device uses a group address to request the specific data and that the controllable device is also a device which processes messages addressed to the group address. In that situation the controllable device sends the requested data to the requesting device on the basis of the stored data in the cache memory. Thus, in this specific example, the solution is also completely transparent for the requesting device because the requesting device is not required to have specific knowledge of the cache memory in the controllable device. Other examples of providing a transparent solution to the requesting device are discussed hereinafter.

It is to be noted that the cache memory may be a part of a larger memory unit of the controllable device. Thus, the physical boundaries between the cache memory and other memories in the controllable device might be difficult to detect, and the only thing that is important is that the controllable device is capable of storing the data received from the resource-constrained device and provide this data when a request for this data arrives at the controllable device.

It is to be noted that the invention is also applicable to network systems with a plurality of controllable devices and with a plurality of resource-constrained devices. Within such a network system, different pairs of a resource-constrained device and a controllable device may be available or different groups of resource-constrained devices and controllable devices may be present. In the invention, the resource-constrained device may control one or more controllable devices. The resource-constrained device may send the data to the one or more controllable devices by sending separate messages to their individual addresses, or the resource-constrained device may send the data in a single message addressed to a group of devices to which the one or more controllable devices belong. In this invention, the provided caching solution is a distributed caching solution because only controllable devices which receive particular data from particular resource-constrained devices (for the control purposes) store the received data in their cache memory and there is no central cache in which the data of all resource-constrained devices is stored. Thereby, it is also prevented that a network overload may occur at such a central cache. If pairs of resource-constrained devices and controllable devices or different groups of resource-constrained devices and controllable devices are present in the network system, the data provided by a specific resource-constrained device is only cached by the controllable device(s) of the pair or of the groups to which the specific resource-constrained device sends the data.

The network of the network system may be a wireless network. The protocols of the wireless network may be designed for communication between devices which are constrained with respect to their resources (such as power). Examples of such networks and such network protocols are ZigBee, the Green Power feature of ZigBee, 6LoWPAN (IPv6 over Low power Wireless Personal Area Networks), CoAP (Constrained Application Protocol), Bluetooth Low Energy, DECT Ultra Low Energy, or combinations (of elements) thereof. It is to be noted that the network is not necessarily limited to wireless networks. A wired network which connects resource-constrained devices to controllable device also falls within the term "network" used herein. Further, instead of the term "resource-constraint device" one may also read "resource-restricted device".

It is to be noted that the invention has as an additional advantage that communication that is dedicated only to filling cache memories can be dispensed with. In the invention, data already sent by the resource-constrained device to the controllable device is stored in the cache memory.

Optionally, data relating to a status of the resource-constrained device is based on at least one of i) information of a sensor of the resource-constrained device and ii) information of a control element of the resource-constrained device. Examples of sensors are: temperature sensor, humidity sensor, light sensor for sensing light intensity and/or light color, occupancy/movement sensor, ultrasonic range finder, sound level sensor, air pressure sensor, motion sensor, acceleration sensor, flow sensor, concentration sensor (e.g. $CO_2$ sensor), power/voltage/current meter, door/window opening sensor, vibration sensor, etc. Examples of control elements are on/off switches, selection switches (selection of one of a plurality of discrete or continuous values), (small) keyboard, dimmer switches, sliders, rotary controllers, touch panels, panic buttons, etc. In an embodiment, the control elements are user-operable. The resource-constrained devices may operate autonomously or be actuated by a user, in an explicit control action or implicitly, e.g. when opening a window and triggering a window opening sensor. The resource-constrained device may be installed at a fixed location, e.g. mounted in a wall/ceiling, or be portable, like e.g. a remote control or keyboard. In many network systems with resource-constrained devices, the resource-constrained devices are sensors that are provided at a location without external power source or they are input devices without additional power source. The sensed information and the input provided by a user is often the data which controls other devices, the controllable devices.

Also combinations of sensors and control elements may be provided. For example, a pressure sensor provided under a floor may also be configured as a control element when a user has to step at a particular location of the floor to control the controllable device (e.g. to switch on or off a light source). Before being transmitted as data to the controllable device, the information of the sensor or of the control element may be processed. For example, when a sensor senses movements (of, e.g., a robotic arm) a counter may be added that counts the movements and the data that is transmitted to the controllable device is the counted value. Alternatively "processing" is applying a function to the information obtained by the sensor or the control element.

In another embodiment, the data relating to a status of the resource-constrained device may be low battery-status data or error code data which controls, at the controllable device, an audible or visual signal-generating component to generate an audible or visual signal which informs users that the battery of the resource-constrained device is almost empty or that an error occurred at the resource-constrained device.

Optionally, the network system further comprises a further controllable device comprising a further communication interface and a further operational component for performing a specific action on the basis of received data, the further controllable device being configured to receive data from the resource-constrained device and to adapt the operation of the further operational component in response to the received data. The resource-constrained device is configured to transmit the data via the communication device also to the further controllable device. The further controllable device comprises a further cache memory for storing the data received from the resource-constrained device and the further controllable device is configured to store the data received from the resource-constrained device in the cache memory, in anticipation of receiving a request for the data stored in the cache memory from a requesting device and to provide the data to the requesting device.

In this particular optional embodiment, the resource-constrained device controls at least two controllable devices. For example, in a lighting system, an occupancy sensor may control a plurality of light sources in a specific space. The resource-constrained device may address each controllable device separately. However, to reduce the communication and/or maintenance burden on the resource-constrained device, often groups of devices are formed in a network system according to the invention and the resource-constrained device uses a group address to send its data to the group address such that controllable devices of the group adapt their operation in accordance with the received data. The controllable device and the further controllable device store the data in their cache memory and they may both provide the data when they receive a request for the data. This creates at least some redundancy in the caching solution of the invention. When the controllable device and the further controllable device are member of a group which is addressable with a group address, the requesting device may use the group address to request the data, which results in an answer from the controllable device and an answer from the further controllable device.

Optionally, the controllable device, the resource-constrained device and the further controllable device are provided with a network address and they are configured to receive messages that are addressed to their network address via the network. The network system comprises an address resolving function for storing a mapping between a name or an identifier of the resource-constrained device and a network address of at least one controllable device that has a cache memory for storing data received from the resource-constrained device. The address resolving function is configured to provide the network addresses in response to a request for providing the network address which is coupled to the name or the identifier of the resource-constrained device. This optional embodiment provides means to make the caching solution of the network system as transparent as possible for the requesting device. In many networks and according to many different protocols, a device connected to the network may have a name in the network or an identifier, and a network address and different solutions are provided to map this name/identifier to a network address. In this optional embodiment, when a requesting device tries to find a network address of a resource-constrained device, the address resolving function automatically provides a network address of a controllable device that stores, or at least most probably stores, the requested data in its memory cache. Thus, the requesting device automatically sends a request for the data of the resource-constrained device to the device which is capable of providing this data.

The mapping between the names or identifiers of the resource-constrained devices and the network addresses of the controllable device must be built up. A specific protocol may be used which provides the address resolving function with mappings between a specific resource-constrained device and the network address of a specific controllable device that stores information for the specific resource-constrained device. For example, as soon as the controllable device stores information for a specific resource-constrained device, the controllable device may send a message to the address resolving function that comprises the mapping/resolving information. The address resolving function may be compared to the function fulfilled by a Domain Name Server (DNS), but with the difference that specific records are provided which map names of resource-constrained devices to addresses of controllable devices.

Examples of network addresses of devices are, in an IP network, the IPv4 or IPv6 address of the respective devices. The IPv6 address may be based on a Medium Access Control (MAC) address. In other network systems, the network address may be the MAC address itself. The MAC address is, for example, an address according to one of the IEEE standards MAC-48, EUI-48, and EUI-64 for such addresses.

Optionally, the controllable device, the resource-constrained device, and the further controllable device are provided with a network address or a name or identifier and are configured to receive messages which are addressed to the network address or the name or identifier. The network system comprises a resource directory function for storing a mapping between specific resources provided by the resource-constrained device and a network address, a name or identifier of at least one controllable device that has a cache memory for storing data received from the resource-constrained device. The resource directory function is configured to provide the network addresses, the name or identifier in response to receiving a request for providing the network address, the name or the identifier for a specific resource that is provided by the resource-constrained device. This embodiment provides transparency to the requesting devices because automatically a mapping towards at least one controllable device with a cache is provided. The term "resources" is used in this context to identify "functions" or for example "capabilities" of devices. For example, the requesting device may ask for a network address, a name or an identifier of a device which provides information about the occupancy of room 5 on floor 1. The resource directory function subsequently provides a network address, a name or an identifier of the controllable device which has this information (most probably) stored in its cache.

Optionally, the network address is an individual network address or a network group address, wherein the individual network address uniquely identifies a single device of the network system and wherein the network group address is an address which belongs to a group of devices. Or, the name is an individual name of a controllable device or a group name, wherein the individual name uniquely identifies a single device of the network system and wherein the group name belongs to a group of devices. It is to be noted that broadcasts or multicasts to groups of network devices fall within the scope of group address or group name.

Optionally, when the network comprises an address resolving function, the address resolving function is provided by an address resolving device of the network system, the address resolving device being configured to perform the functions of the address resolving function or the address resolving function is distributed among devices of the network system and the devices of the network system are configured to provide the address resolving function in cooperation with each other. For example, a Domain Name Server (DNS) is embodied in a single server, or a distributed DNS protocol is used, such as xmDNS or mDNS. As discussed earlier, a difference between the address resolving function of the invention and known DNS solutions is the use of specific records with the specific mapping that is required for transparent access, by the requesting device, to the data of the resource-constrained devices, which data is stored in the controllable devices.

Optionally, when the network comprises a resource directory function, the resource directory function is provided by a resource directory device of the network system, the resource directory device being configured to perform the functions of the resource directory function, or the resource directory function is distributed among devices of the network system and the devices of the network system are configured to provide the resource directory function in cooperation with each other.

Optionally, the resource-constrained device transmits further data via the communication interface to the particular controllable device. The further data also relates to the status of the resource-constrained device and does not directly control an action of the controllable device. The controllable device is configured to store the further data in the cache and to provide the further data to the requesting device when a request for the further data has been received by the controllable device. In particular protocols and/or network communication technologies, further data is always transmitted in data packets that are sent to other devices. In such situations it is advantageous to store this information also in the cache memory of the controllable device such that requesting devices may obtain this information as well. The solution of this optional embodiment is also transparent for the resource-constrained device because the resource-constrained device already sends this information for other purposes (such as for example prescribed by a protocol) and the resource-constrained device does not have any knowledge of the caching of the further data.

Optionally, the further data comprises one of i) an identifier of the resource-constrained device, ii) capabilities of the resource-constrained device, iii) configuration information of the resource-constrained device, e.g. security services used, iv) freshness data, e.g. time stamp, sequence number, frame counter, v) power status of the resource-constrained device, vi) energy status of the resource-constrained device, etc. Energy is often the most limited resource of a resource-constrained device and in sensor monitoring protocols it might be required to transmit in every data packet the actual power and/or energy status (for example, how much energy is left in a battery or the status of the received power via e.g. a power line), so that the sensor may be replaced or may receive a new battery or may be recharged before all energy is consumed. Other examples of such further data are: vii) location information of the resource-constrained device, viii) one or more error codes, ix) one or more log entries, x) a detection flag of physical intrusion on the resource-constrained device's hardware, xi) manufacturer name/type/model/serial number, xii) firmware version, xiii) network diagnostic information from the communication interface, xiv) number of packets sent/received via the communication interface, xv) number or address of routing parents of the resource-constrained device, xvi) number or address of other controllable devices controlled by the resource-constrained device, xvii) measure of network congestion, xviii) status of all inputs of input devices: status of all control elements and/or xix) sensors of the resource-constrained device.

Optionally, the cache memory is also configured to store other data that must be provided to the resource-constrained device, and the controllable device is configured to receive other data for providing said other data at a later point in time to the resource-constrained device, and it is configured to store the other data at least temporarily in the cache memory and to transmit the other data to the resource-constrained device when the resource-constrained device is capable of receiving the other data. Then, when a data providing device wants to provide other data to the resource-constrained device, this optional embodiment provides means to guarantee that the data is received by the resource-constrained device. The data providing device may be the requesting device but may also be another device in a network that is capable to communicate with the controllable device and/or the resource-constrained device. As discussed previously, this embodiment may be combined with address resolving functions or resource resolving functions that provide network addresses or names of controllable devices that have a cache memory and that are in contact with specific resource-constrained devices. It is to be noted that the word "other" is not used to indicate that the other data is by definition of a different nature than the data or the further data that is provided by the resource-constrained device to the controllable device. The term "other" is used to distinguish, in this context, data that is sent from a requesting device (or a data providing device) to a resource-constrained device from the data that is sent from the resource-constrained device to the controllable device.

Optionally, the communication interface of the resource-constrained device has an operational mode and a non-operational mode, wherein the resource-constrained device is unable to communicate with other devices via the communication interface when this interface is in the non-operational mode, and wherein the resource-constrained device is able to communicate with other devices via the communication interface when this interface is in the operational mode. The schedule for the operational mode and the non-operational mode may be a regular schedule, but may also be influenced by interrupts. An example of an interrupt is that the resource-constrained device comprises a switch that is operated by a user. Another interrupt may originate from a sensor which detects a value that deviates from a predetermined value or, for example, exceeds a threshold value. In another embodiment, the schedule for the operational mode and the non-operational mode may be determined in an energy harvesting device on the basis of the harvested energy. Even in an extreme case, the resource-constrained device uses all harvested energy during communication via the communication interface and enters the non-operational mode because of a lack of energy only after having harvested so much energy that the operational mode may be entered again.

According to a second aspect of the invention, a lighting system is provided which comprises a light source, a light source controlling device and the network system for caching information from a resource-constrained device according to the first aspect of the invention. The light source is the controllable device and a light emission of the light source is controlled in response to the reception of data from the light source controlling device. The light source controlling device is the resource-constrained device.

The light source controlling device is for example an input device, e.g. a switch, that may be operated by a user, or a sensor that senses the intensity of light (e.g. of daylight) or an occupancy sensor. Often, in a lighting system, one light source controlling device controls a plurality of light sources and, therefore, data sent by the light source controlling device is sent to a plurality of light sources. Sending the data to a plurality of light sources may be performed by sending a plurality of data packets to a plurality of light sources or by sending a single data packet that is addressed to a group of devices or by using a broadcast protocol to send the data to at least all light sources.

A requesting device which may request data that relates to the status of the light source controlling devices is, for example, a building management system that wants to know whether rooms are occupied, whether light sources are still switched on in particular rooms, how much daylight is detected in the particular rooms, what the battery/power status is of resource-constrained devices in particular rooms, etc.

Other typical use cases of the network system according to the first aspect of the invention are alarm systems which comprise, for example, smoke sensors which act as the resource-constrained device and a device which produces visual or audible alarm signals which acts as a controllable device. A typical requesting device is a central alarm system of the building which requests the status of the smoke sensors on a regular basis. A further typical use case of the network system according to the first aspect of the invention is the use of the network system in a climate management system of a building, wherein the resource-constrained devices may be formed by temperature, humidity, $CO_2$ sensors, sun-light sensors and/or wind force sensors, and the controllable devices are, for example, a heating device, a ventilation device, an air conditioning device, window opening/closing devices, devices which open and close blinds, etc. A building management system may be the requesting device which wants to know the status of different sensors in the building.

According to a third aspect of the invention, a method of caching information from a resource-constrained device in a network system is provided. The network system comprises a resource-constrained device and a controllable device. The method comprises the stages of a) generating data relating to a status of the resource-constrained device, b) transmitting the generated data from the resource-constrained device to the controllable device, c) receiving the generated data at the controllable device, d) performing a specific action at the controllable device in response to the received data, e) storing the received data in a cache memory of the controllable device, f) receiving from a requesting device a request for the data stored in the cache memory, g) providing to the requesting device data stored in the cache memory in response to received request. The method according to the third aspect of the invention provides the same benefits as the network system according to the first aspect of the invention and has similar embodiments with similar effects as the corresponding embodiments of the system.

It is to be noted that the transmitting stage comprises situations wherein the generated data is transmitted in, for example, a data packet that is explicitly addressed to the controllable device or wherein said data is transmitted in, for example, a data packet that is not explicitly addressed to the controllable device, but is received by the controllable device because, for example, a group address or a multicast was used and the controllable device is capable of receiving data packets sent to the group address or sent via a multicast.

It is further to be noted that the above order in the stages of the method does not limit the actual order of the stages. It is only in so far as the stages depend on each other that the interdependencies determine the actual order. For example, the stage of performing a specific action and storing the received data may be performed in another order because they are independent of each other—they only depend on the stage of receiving the data.

Optionally, a subset of devices of the network system are provided with a network group address, and the network system comprises an address resolving function for storing a mapping between network group addresses of groups of devices and names of the respective devices of the group. The method comprises the further stages of: i) requesting the address resolving function to provide an address for a specific name of a specific device of the network system, ii) providing a network group address of a group to which the specific device belongs in response to receiving the request for providing the address. The stages of this optional embodiment are, typically, performed before (f) receiving a request from a requesting device, and may be performed in parallel with the stages a) to e) of the previously discussed embodiment of the method or may be performed after stage e) and before stage f).

According to another aspect of the invention, a distributed software system is provided which comprises instructions for causing one or more processor systems to perform the method according to the previously discussed aspect of the invention. Different portions of the software system may be executed at different processor systems which are distributed among different physical entities. The distributed software system comprises different computer programs and the set of computer programs comprises all the instructions to cause one or more processor systems to perform the method according to the previously discussed aspect of the invention. The distributed software system may be stored in a suitable storage medium, such as a hard disk, a floppy, a memory etc. The software system may also be stored in a distributed manner in several devices, which means that portions of the software system are physically stored at other suitable storage media. The software may be sent as a signal along a wire, or wirelessly, or using a data network, e.g., the Internet. The software may be made available for download and/or for remote usage on a server.

According to yet another aspect of the invention, the invention may relate to a single controllable device which comprises the features and the characteristics of the controllable device that is being used in the network system according to the first aspect of the invention. The single controllable device may be modified according to optional embodiments of the network system.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the system and method disclosed herein, which correspond to the described modifications and variations of the system and method, can be carried out by a person skilled in the art on the basis of the present description.

Figure 1:
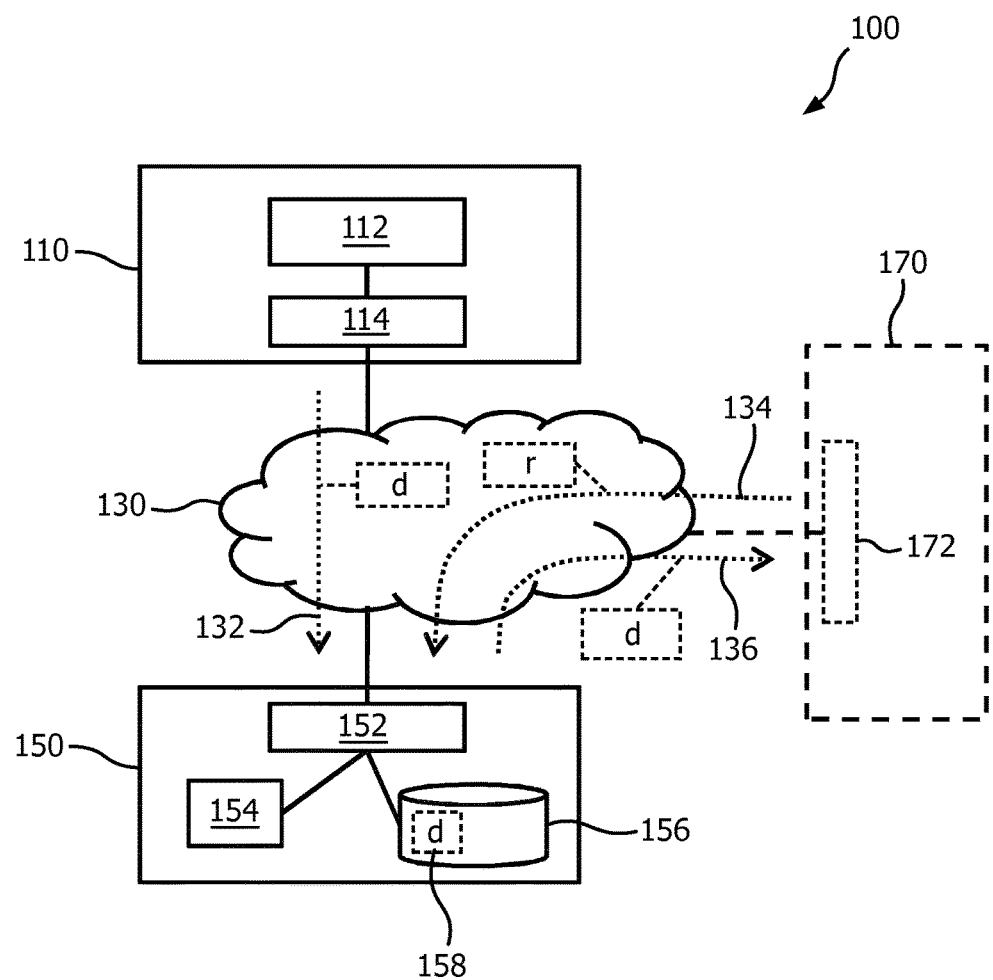
FIG. 1 schematically shows an embodiment of a network system according to the first aspect of the invention, FIG. 2 schematically shows another embodiment of a network system, FIG. 3 schematically shows a further embodiment of a network system, FIG. 4a schematically shows embodiments of resource-constrained devices, FIG. 4b schematically shows embodiments of controllable devices, FIG. 5 schematically shows an embodiment of a method of caching information from a resource-constrained device in a network system, and FIG. 6 schematically shows an embodiment of a network system used to discuss further embodiments of a method of caching information from a resource-constrained device in a network system.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION

A first embodiment is shown in FIG. 1. FIG. 1 schematically shows an embodiment of a network system 100 according to the first aspect of the invention. The network system 100 comprises a controllable device 150, a resource-constrained device 110 and a network 130.

The controllable device 150 comprises a first communication interface 152 and an operational component 154 for performing a specific action on the basis of received data d. The controllable device 150 is configured to receive the data d via the first communication interface 152. The controllable device 150 further comprises a cache memory 156 in which the received data d is also stored in a specific field, record or location 158 of said cache memory 156.

The resource-constrained device 110 is limited with respect to one of its resources, which might be energy/power. For example, the resource-constrained device 110 comprises, for example, a battery (not shown), possibly in combination with an energy harvesting device, for providing power to the resource-constrained device 110. The resource-constrained device 110 further comprises a second communication interface 114 and a data generator 112. The data generator 112 generates data d which must be transmitted to the controllable device 150 for controlling the operational component 154 of the controllable device 150. The generated data d is based on a status of the resource-constrained device 110. If the data d is generated, the data d is transmitted 132 via the second communication interface 114 and the network 130 to the controllable device 150.

The term "status of the resource-constrained device 110" comprises several embodiments. Without limiting those embodiments, the status of the resource-constrained device 110 may relate to information of a sensor (not drawn) of the resource-constrained device 110, information of a control element (such as a user-controllable switch) of the resource-constrained device 110, or e.g. the status of a battery or energy harvesting hardware (not shown). At the controllable device 150, the data d, which is based on this information, results at the operational component 154, for example, in switching on or off means for generating light and/or audio, switching such means for generating light and/or audio in a specific operational mode (such as, e.g., emitting another color of light, emitting at another intensity of light, or generating or emitting a specific audible or visual signal), controlling an actuator, presenting information on a display, etc.

In FIG. 1 a requesting device 170 is drawn which also comprises a communication interface 172 and which is capable of communicating with devices that are connected to the network 130. The requesting device 170 may transmit a request r for data d. For example, the requesting device 170 may transmit 134 a request r because it wants to know what the current (or most recently known) status of the control element or the sensor of the resource-constrained device 110 is.

The controllable device 150 may receive such a request r for the data d. The controllable device 150 is configured to transmit 136 the data d to the requesting device 170, in response to receiving the request r for the data d, when it has the data d stored in its cache memory 156.

The network 130 may be a wireless network, but may also be a wired network between resource-constrained devices and controllable devices.

In an embodiment, at least the second communication interface 114 of the resource-constrained device 110 may operate in a non-operational mode and in an operational mode. In the non-operational mode, the second communication interface 114 is not capable of receiving or transmitting information from and to the network 130. In the operational mode, the second communication interface 114 is capable of receiving or transmitting information from and to the network 130. The second communication interface 114 may be controlled automatically to enter the non-operational mode, when, for example, the amount of energy available in the resource-constrained device reaches an absolute minimum such that the second communication interface 114 cannot operate anymore, and when enough energy becomes available (e.g. from an energy harvesting element), the second communication interface 114 may be controlled to enter the operational mode. The resource-constrained device 110 may also be configured to control the second communication interface 114 according to a schedule, or on the basis of interrupts, to enter the operational and the non-operational mode. In this last scenario, the control to enter the non-operational mode is performed to prevent unnecessary use of the constrained resource, such as, for example, an amount of available energy.

Figure 2:
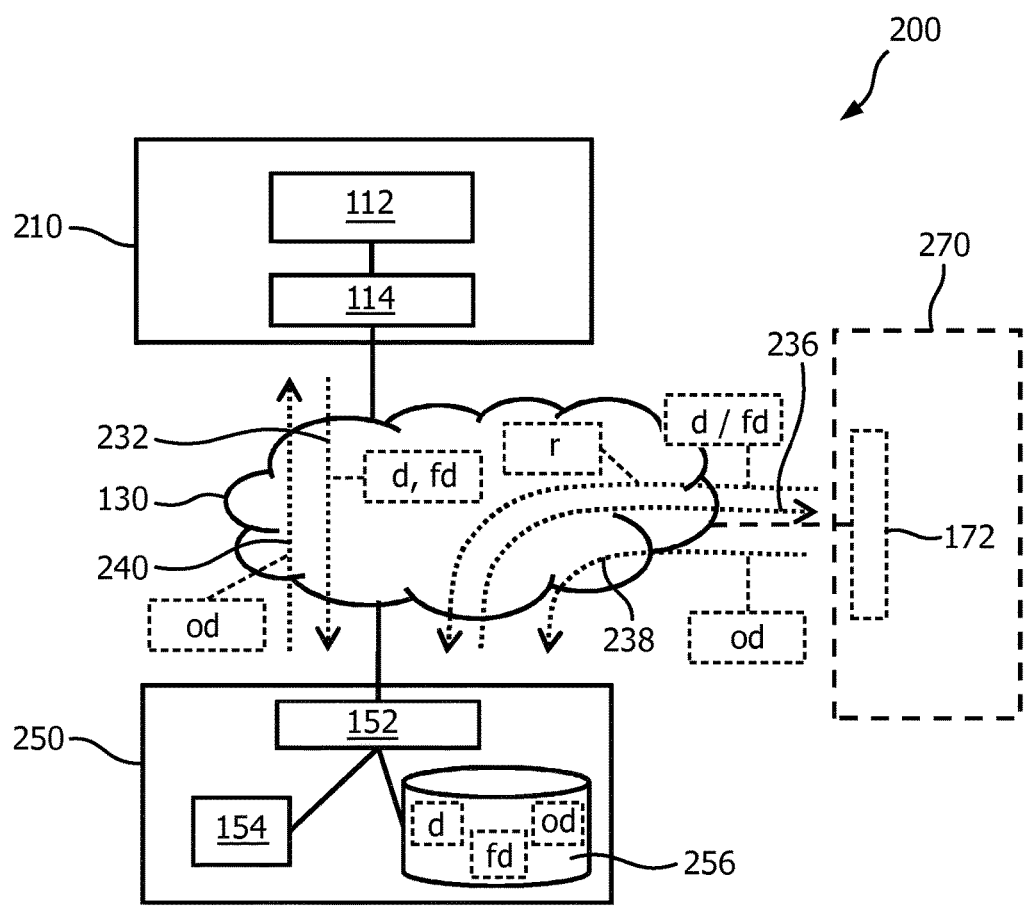

FIG. 2 schematically shows another embodiment of a network system 200. The network system 200 of FIG. 2 is similar to the network system 100 of FIG. 1, with this difference that also "further data" and "other data" is transmitted between different devices of the network system. The network system 200 comprises a resource-constrained device 210, a controllable device 250 and a network 130.

The resource-constrained device 210 also comprises the data generator 112 and the second communication interface 114. The resource-constrained device 210 may be configured to transmit 232, together with the data d, also further data fd. The further data fd also relates to the status of the resource-constrained device 210, however, this data is not used by the controllable device 250 to control its operational component 154.

The controllable device 250 also comprises the first communication interface 152, the operational component 154 and a cache memory 256. The data d and further data fd are received in, for example, a data packet received by the first communication interface 152. The controllable device 250 is configured to use the data d for changing an operational status of the operational component 154 and is configured to store the data d and the further data fd in the cache memory 256. The controllable device 250 may receive from a requesting device 270 a request r for the data d and/or the further data fd. In response to receiving such a request r, and when the requested data d and/or further data fd is stored in the cache memory 256, the controllable device is configured to transmit 236 the data d and/or the further data fd to the requesting device 270.

The further data fd is typically data that is always transmitted in data packets that are transmitted by the resource-constrained device 210 to the controllable device 250. Thus, no additional overhead is created by including this data. Without limiting possible embodiments of the further data, examples of the further data are: power status of the resource-constrained device 210, energy status of the resource-constrained device 210, identifier of the resource-constrained device 210, capabilities of the resource-constrained device 210, configuration information of the resource-constrained device 210, freshness data, location information of the resource-constrained device 210, one or more error codes, one or more log entries, a detection flag of physical intrusion on the resource-constrained device's hardware, manufacturer name/type/model/serial number, firmware version, network diagnostic information from the second communication interface, number of packets sent/received via the second communication interface, number or address of routing parents of the resource-constrained device 210, number or address of other controllable devices controlled by the resource-constrained device 210, measure of network congestion, status of all inputs of input devices, status of all control elements and/or sensors of the resource-constrained device 210.

When the requesting device 270 wants to transmit 238 other data od to the resource-constrained device 210, the data is most probably not received by the resource-constrained device 210 because (at least) the second communication interface 114 of the resource-constrained device 210 may be in a sleep mode for most of the time. The cache memory of the controllable device 250 may be used to temporarily store the other data od. The controllable device 250 may receive from the requesting device 270 a data packet which contains the other data od, and it is indicated to the controllable device 250 that the other data od must be provided to the resource-constrained device 210. The controllable device is configured to store the other data od at least temporarily in the cache memory 256 such that the data may be provided to the resource-constrained device 210 at a later moment in time. When the controllable device 250 knows that the second communication interface 114 of the resource-constrained device 210 is in an operational mode, the controllable device 250 transmits 240 the other data od to the resource-constrained device 210. The controllable device 250 may have knowledge about the period of time that the second communication interface 114 is in the operational mode, for example, based on a previously received schedule, known patterns in the schedule of the modes of the second communication interface 114, or, for example, based on the fact that it recently received data d and/or further data fd from the resource-constrained device 210. Examples of other data od may be data settings for the resource-constrained device 210, program update(s), and also, for example, a request for data d that has not yet been cached by a controllable device.

In the above discussion of FIG. 1 and FIG. 2, it has been assumed that the requests r for the data of the resource-constrained device arrive at the controllable device 150, 250 or that other data od for provision arrives at the controllable device 150, 250. This may be the case when the requesting device 170, 270 uses, for example, unicasts of several messages or group-cast messages to transmit this data simultaneously towards a plurality of devices such that the requests r and the data packets with the other data od are received by the controllable device 150, 250 and, when the second communication interface of the resource-constrained device 110, 210 is in the operational mode, by the resource-constrained device 110, 210. In particular applications, and also in particular network standards, messages are transmitted to all devices. Alternatively, resource-constrained devices and controllable devices are arranged in groups and data packets for one or more devices of such a group are immediately addressed to the group as a whole. Only the devices for which the message is relevant interpret and process the message.

It is further to be noted that the network system 100 and 200 of FIGS. 1 and 2 may comprise more than one resource-constrained device and more than one controllable device. A single resource-constrained device may transmit the data d to one or more controllable devices for controlling their operation. A single controllable device may receive data d for controlling the operation of the controllable device from one or more resource-constrained devices. Thus, when a single resource-constrained device transmits the data d to a plurality of controllable devices, each controllable device stores the data d also in its respective cache memory. When several unicasts or a groupcast are used by the requesting device, a plurality of controllable devices which have the data d in their cache memory may receive the request r. In a first embodiment, all controllable devices which have the data d in their cache memory reply by sending the data d to the requesting device and the requesting device has hardware, algorithms or heuristics to select at least one received reply as the main reply with the data d. It is also possible that the plurality of controllable devices have implemented an algorithm which prevents that all controllable devices transmit a reply. For example, when all controllable devices are able to listen to all messages that are transmitted via the network (e.g. in a wireless network), a controllable device may decide not to send a reply when it has detected that another controllable device had already sent a reply.

Figure 3:
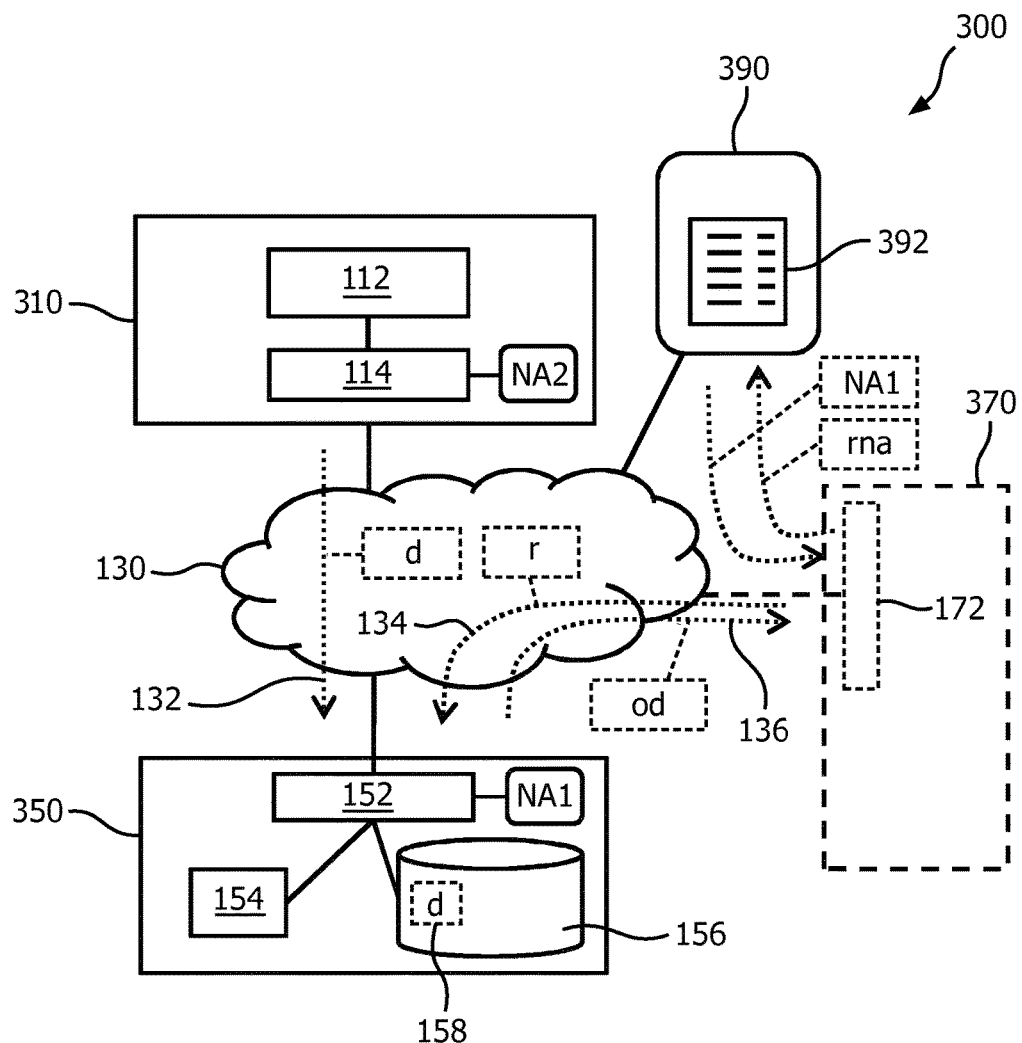

FIG. 3 schematically shows a further embodiment of a network system 300. The network system 300 comprises a resource-constrained device 310, a controllable device 350, a requesting device 370, an address resolving function 390 and a network 130. At least the controllable device 350 has a first network address NA1 within the network 130. The controllable device 350 is configured to receive, via the first communication interface 152, data/information/packets addressed to the first network address NA1 via the network 130. Other characteristics of the controllable device 350 are similar to characteristics of the controllable devices 150, 250 of FIG. 1 and FIG. 2. A second network address NA2 may be assigned to the resource-constrained device 310 and the second communication interface 114 of the resource-constrained device 310 may be configured to receive data/information/packets addressed to the second network address NA2 via the network 130. Other characteristics of the resource-constrained device 310 are similar to characteristics of the resource-constrained devices 110, 210 of FIG. 1 and FIG. 2. The resource-constrained device may also have a name or an identifier. A name is a string of characters that may be readable and understandable for a human person. An identifier is also a string of characters which is most probably not intelligible for a human person unless this human person has knowledge of a specific scheme of assigning identifiers. The resource-constrained device 310 cannot directly receive data/information/data packets via the network on the basis of the use of the name or the identifier only. The data/information/data packets transmitted via the network should comprise, in the context of this embodiment, the network address. An example of a network address is an IP address, or a MAC address. Network addresses are used within the network to deliver the data packets to the correct device, and the devices which receive data packets may use the network address to decide whether the received data packet must be further processed and interpreted within the device. An example of a name of a device is "light_source_room_5" or "temperature_sensor_corridor".

The address resolving function 390 comprises a mapping between a name or identifier of the resource-constrained device 310 and a network address of at least one controllable device 350 that has a cache memory 156 for storing data d that the at least one controllable device 350 receives or previously received from the resource-constrained device 310. The requesting device 370 may be configured to request ma the address resolving function 390 to provide a network address for a specified name of a resource-constrained device. The address resolving function 390 is configured to provide the first network address NA1 of the controllable device 350 which has the data d of resource-constrained device 310 stored in its cache memory when the provided name was the name of the resource-constrained device 310. Subsequently, when the requesting device 370 sends a request r for the data d of the resource-constrained device 310, the requesting device 370 uses the received first network address NA1.

It is to be noted that that address resolving function 390 may, instead of or in addition to storing network addresses of controllable devices, store a network group address in which the controllable device 350, which comprises the data d in its cache memory 156, is present. In response to receiving a request to provide a network address for a specific name or identifier of a resource-constrained device 310, the address resolving function 390 may provide the stored network group address to the requesting device.

The address resolving function 390 may be provided by a single device which is, for example, a (domain) name server. In this situation, the address resolving function 390 is centralized in the network 130. The address resolving function 390 may also be implemented in a distributed manner which means that several devices of the network 130 perform the address resolving function in cooperation. "In cooperation" means that a single device cannot provide the full address resolving function 370, but that the combination of the several devices can provide the full address resolving function 370.

In the above embodiment of FIG. 3, instead of, or in addition to, "address resolving function" the term "resource directory function" may be read. A resource directory is a mapping between available resources and devices which provide such a resource. The term "resources" is used in this context to identify "functions" or "capabilities" of a device. The resource directory function provides a mapping towards devices which provide such a function or have such a capability, and the resource directory function may store a name, an identifier, or a network address of the devices. Devices may send a request to the resource directory function asking it which devices in the network 130 provide a specific resource, and the resource directory function may provide an answer stating the names/identifiers/network address of all or a selected set of the devices which provide such a resource. Preferably, in so far as it concerns resource-constrained devices, the resource directory function provides the names/identifiers/network addresses of controllable devices which have stored the data d of the resource-constrained device(s) that provide the specific resource. For example, the requesting device may ask for a network address, a name or an identifier of a device which provides information about the occupancy of room 5 on floor 1 and the resource directory function may reply by providing the network addresses of all light sources in room 5 on floor 1 which are controlled by the occupancy sensor device in room 5 on floor 1.

The network systems 100, 200 and 300 of FIGS. 1, 2, and 3 may be used in specific use cases. For example, the network system is a lighting system wherein the resource-constrained devices are devices that control light emitters/light sources and the controllable devices are light emitters/light sources. For example, a switch, which may be operated by a user, is a resource-constrained device and all light sources in the room in which the switch is provided may be controllable devices that are controlled by the switch. Simultaneously, a sensor may be provided in the room which also controls all the light sources. Another use case relates to a building management system. Sensors may be the resource-constrained devices. Examples of sensors are temperature sensors, humidity sensors, light intensity sensors, etc. The controllable devices are, for example, devices which may influence the temperature, the humidity, the light intensity level, such as, for example, a heating device, an air conditioning device, an actuator for shutters or blinds, etc.

Figure 4A:
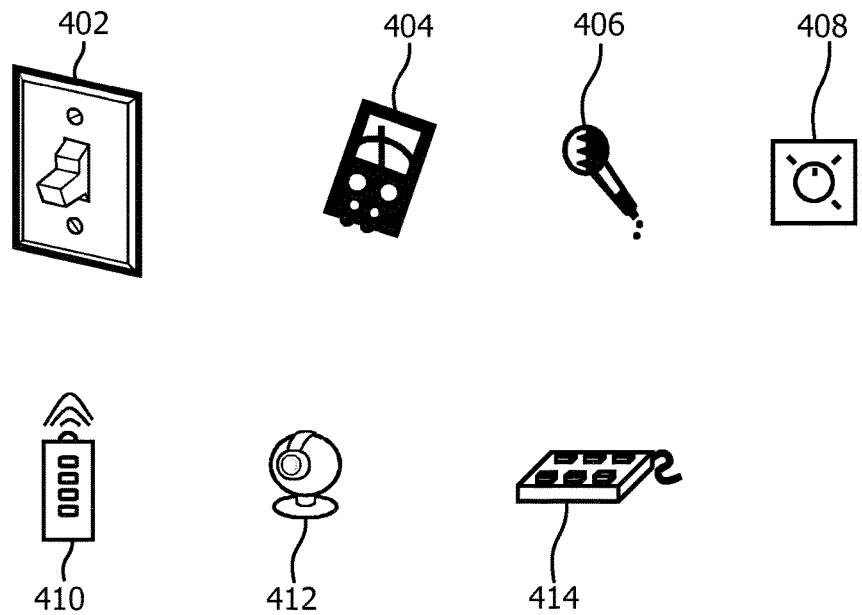

FIG. 4a schematically shows embodiments of resource-constrained devices. A first embodiment is a switch 402 which may be operated by a user to control the switching on or off of, for example, a light source. A second embodiment are sensors 404 which measure a specific environmental parameter, such as, for example, temperature, humidity, average lighting intensity, etc. A third embodiment is a sound sensor 406. A fourth embodiment is a selecting switch 408 which may be operated by a user to select one of a plurality of different options. The different options may relate to, for example, different illumination conditions in a specific room, or different sounds that must be played. A fifth embodiment is a remote controller 410 which receives user input for controlling another device. A sixth embodiment is a camera 412 or, for example, an occupancy sensor. A seventh embodiment is a keyboard 414 for receiving user input with respect to the controlling of another device. The transmitted data d which relates to the status of the above-discussed resource-constrained device may be a value that indicates the actual position in which a control element (switch) is arranged or the actual value measured by a sensor. The transmitted data d may also be the result of processing data received from the control element (switch) or the sensor and the transmitted data d may be more explicitly control data, such as "switch on", "emit blue light", "switch off", "shut the shutters", etc.

Figure 4B:
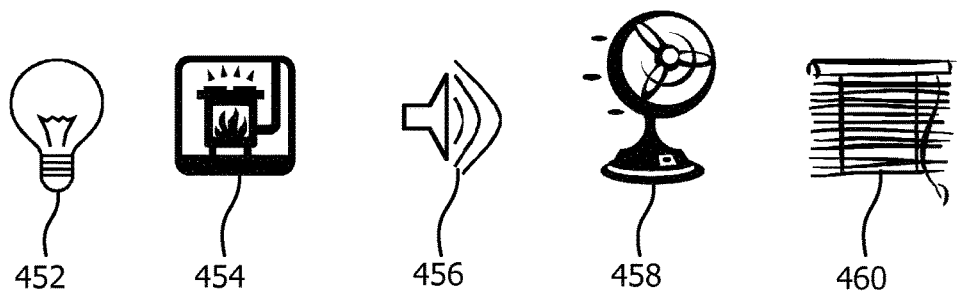

FIG. 4b schematically shows embodiments of controllable devices. A first embodiment is, for example, a light source 452. The light source 452 comprises additional circuitries (not shown) for controlling the light emission of a light emitter of the light source 452 in dependence on the received data d. For example, the intensity of the light emission may be controlled, or the color distribution. Other controllable options may be, for example, the width of the light beam and the direction in which the light beam is emitted. A second embodiment is, for example, a heating device 454. A third embodiment is a device 456 that is capable of generating audible signals, such as, an audio device, or an alarm horn. A fourth embodiment is a fan 458 of an air-conditioning unit. Blinds 460 or shutters are a fifth embodiment. The operational component of the above embodiments of the controllable devices are, respectively, a light emitter, a heating element/system, a loudspeaker or horn, a cooling system/element, an actuator for moving positions of shutters.

Figure 5:
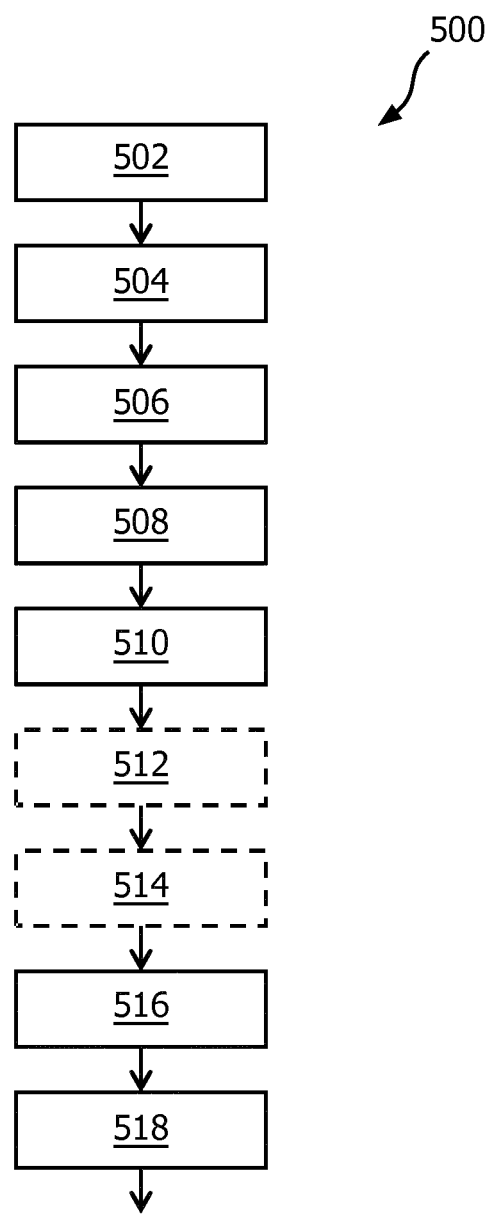

FIG. 5 presents an embodiment of a method 500 of caching information from a resource-constrained device in a network system. The network system comprises a resource-constrained device and a controllable device. The method comprises the stages of: i) generating 502 data relating to a status of the resource-constrained device, ii) transmitting 504 the generated data from the resource-constrained device to the controllable device, iii) receiving 506 the generated data at the controllable device, iv) performing 508 a specific action at the controllable device in response to the received data, v) storing 510 the received data in a cache memory of the controllable device, vi) receiving 516 from a requesting device a request for the data stored in the cache memory, vii) providing 518 to the requesting device data stored in the cache memory in response to a received request. Optionally, a subset of the devices of the network system are provided with a network group address and the network system comprises an address resolving function for storing a mapping between network group addresses of groups of devices and names of the respective devices of the group. Optionally, the method 500 further comprises the stages of a) requesting 512 the address resolving function to provide an address for a specific name of a specific device of the network system, b) providing 514 a network group address of a group to which the specific device belongs in response to receiving the request. It is to be noted that the stages of requesting 512 and providing 514 are drawn in FIG. 5 in between the stages of storing 510 and receiving 516, but the stage of requesting 512 and providing 514 may also be provided at another point in the chain of stages of the method 500 or may be executed in parallel with one or more of the drawn stages.

Figure 6:
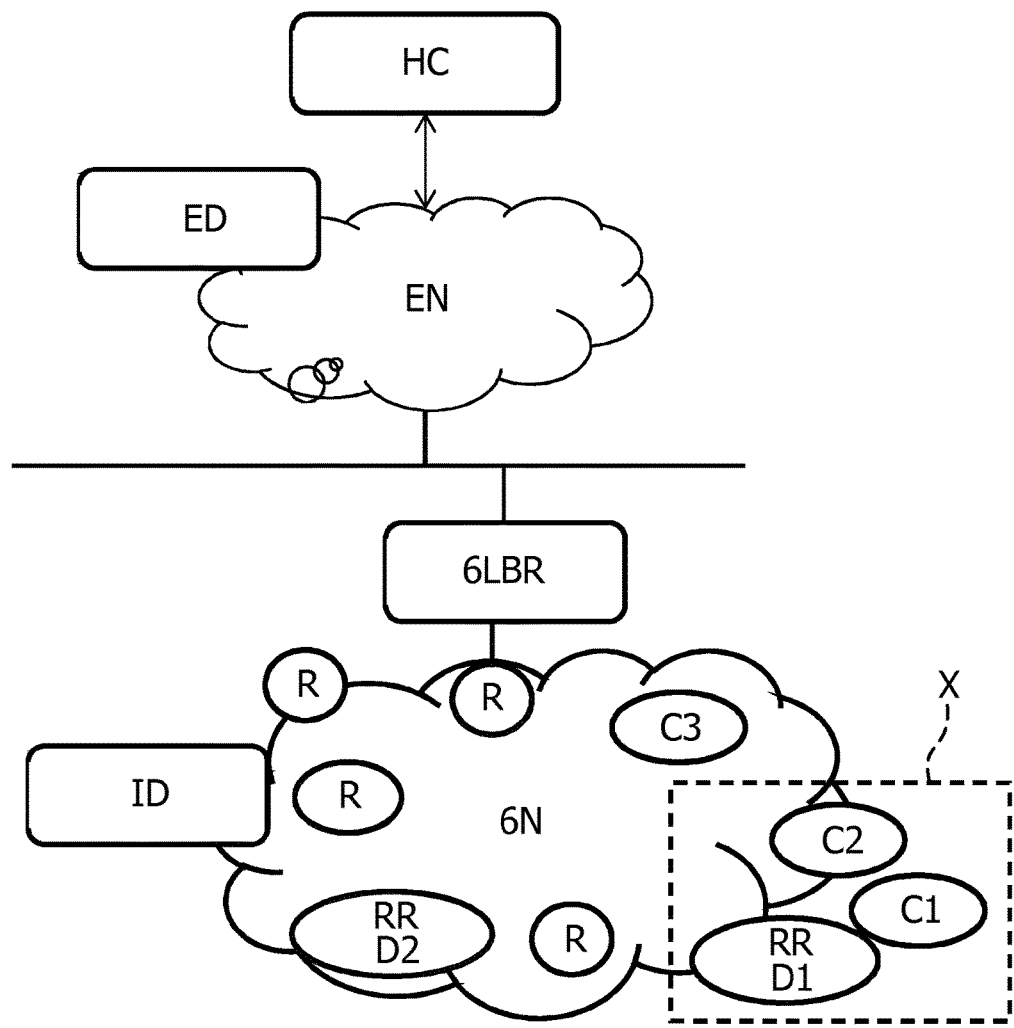

In the following sections, further embodiments of the method and/or the network system are discussed:

FIG. 6 schematically shows a network system falling within the scope of the invention. At the top there is drawn a requesting http client device HC which is coupled to an external network E-Network EN, referred to in FIG. 6 as EN. The external network E-Network EN has a domain name system server or distributed domain name resolving function E-DNS ED, referred to in FIG. 6 as ED. At the bottom there is drawn a 6LoWPAN network 6N in which several devices R, controllable device C1 . . . C3, and resource-constrained device RRD1, RRD2 are provided. Within the 6LoWPAN network 6N an (internal) domain name system ID is also available. Resource-constrained device RRD1 and controllable devices C1, C2 form a group X. The 6LoWPAN network 6N is coupled to the external network E-Network EN via a 6LoWPAN Border Router 6LBR.

A method of the invention may be performed within the network of FIG. 6.

The method starts with the initialization. The resource-constrained device RRD1 reports status changes to group X, and is a member of group X. The resource-constrained device RRD1 is a member of each group it reports to. The group X may be programmable into the device, at production or during commissioning time. There may be standard-defined ways to derive the unique multicast address per resource-constrained device, e.g. to derive it from its IEEE address or unicast address, to minimize the commissioning effort. The resource-constrained device RRD1 may use the multicast address for one/multiple/all exposable resources; i.e. the resource-constrained device may report to multiple groups using one or multiple multicast addresses.

The controllable devices C1, C2 controlled by the resource-constrained device RRD1 are members of group X. It is the result of a commissioning procedure (local or centralized, user-triggered or automated, etc.). The controllable devices C1, C2 of group X create a local cache for the data they will receive from the resource-constrained device RRD1. This may be pre-defined, configured as part of the commissioning process, or dynamically created upon reception of a new resource report sent to the multicast group. The local cache may be created on some, all, or a predefined group of members of group X, e.g. based on criteria such as: reliability of communication from/to the constrained device/ the 6LBR, available cache resources, number of other caches available, etc. In addition, the members of group X may cache other relevant information related to the cached resource, e.g. the reporting frequency, the thresholds, etc. Discovery service (e.g. I-DNS ID and/or E-DNS ED) resolves the resource uniform resource identifier URI (hostname) of resource-constrained device RRD1 into the multicast address of group X. That can be automatically derived (e.g. as part of the registration process for the resource-constrained device RRD1, if any), or configured—by the resource-constrained device RRD1 itself, or any of the other members of group X, or the commissioning tool/manager. The discovery service I-DNS ID can be located on the border router 6LBR or on any other device in the network, and can be centralized or distributed. Standard mechanisms may be used for it.

After the initialization, a requesting HTTP client HC may query for data from the resource-constrained device RRD1.

Step 1: There is an external request for data of the resource-constrained device RRD1. The request may be sent by the HTTP client HC. Note that the requested data is data that has already been reported by resource-constrained device RRD1 to group X.

Step 2: Resolution: The name, identifier, or resource of resource-constrained device RRD1 is resolved to a multicast address. The resolution (i.e. process of resolving) may be done internally in the 6LBR (in case of an external request) by, for example, the I-DNS service ID provided by the 6LBR, or via any discovery mechanism, such as multicast domain name system mDNS, xmDNS or a resource directory RD. The discovery information may be available on the local network or on the Internet. In case of an external client, a two-step approach can be used: the external client can first be pointed to the 6LBR, and the 6LBR starts a second resolution process that may point to the (link-)local address, anycast address, unicast address or multicast/group address. Alternatively, global addresses can be used and provided directly to the external http client HC; including anycast addresses, unicast addresses or multicast/group addresses.

Step 3: a request for data, i.e. a query, is sent to the multicast address of group X. If it is an external request, the 6LBR does the discovery/resolving. It may execute other actions, like translating a unicast HTTP request to a multicast Constrained Application Protocol CoAP request. If the request is internal, i.e. from a device within the 6LoWPAN network 6N, the requester itself can perform the resolution of step 2. Because the address information in the request does not point to the constrained device directly, there must be some indication in the request frame about the actual data requested.

Step 4: Members of group X answer the query. All (currently active) members of group X receive the query. The active members are at least the controllable devices C1, C2. The query body must be linked to the data available/cached on the cache of the controllable device C1, C2. In one embodiment, the linking may be implicit. For example, the fact that the request is addressed to a particular group may implicitly indicate a particular constrained device (or even its particular resource). Also, the linking may be implicit if the data is non-overlapping; e.g. if the cache only caches status/data of one resource-constrained device and does not have such a status/data resource itself. In another embodiment, an explicit data mapping may be required. It may be pre-defined mapping, with a pre-defined string appended to the data in the request. For example, the requested sensor's data/status of "/sensor/occupancy/RRD1/status/occupancy" can be "/light/L1/cache/sensor/occupancy/RRD1/status/occupancy". In another embodiment, there may be a need for mapping the internal status representation in the cache, e.g. "/light/L1/handlers/occupancy" to the actual requested resource "/sensor/occupancy/RRD1/status/occupancy". The mapping, if used, may be internal to the cache, or may also be exposed to the outside world, e.g. in the resolution mechanism, such that the requester itself can already perform the mapping.

If the device which receives the request/query does not have a (copy of) the requested data, in the simplest embodiment, it just drops the request. In another embodiment or in other error cases, e.g. the data does not have a current value, or the value is outdated, then the device—unless it sees another node responding to the request—forwards the request to the resource-constrained device RRD1. The device itself may buffer the request for forwarding, if in range, or may forward to the resource-constrained device's parent/proxy, if any. If the device does have a cache copy of the data, it prepares an answer, optionally indicating clearly that it is a cached copy (preferably in a standard-compliant manner). This optional indication is preferably included such that a requester not expecting to receive such indication, or not knowing the format of such optional indication, can still correctly read the value of the requested data and thus safely ignore the indication. If possible, it indicates also the age/remaining validity of this value (preferably in a standard-compliant manner).

Preferably, there is a mechanism to limit the number of responses. A distributed mechanism can be used, e.g. the controllable devices C1, C2 may schedule responding after a randomized delay, and drop its own scheduled response if more than x responses are observed during the waiting period (wherein x may be 0, 1, 2, 3 or higher). The delay can be purely random, or based on some information available to the cache nodes, e.g. frequency/time of previous forwarding, validity/freshness of the cached information, etc. There may be a dedicated mechanism to select the responding controllable device C1, C2 from among those in the group. It can e.g. be based on controllable device C1, C2 activity (e.g. a heartbeat signal) and a selection criterion, e.g. lowest numerical address. The selection can be done centrally or locally, or autonomously by each node, dependent on the selection-related data received. Also, the controllable device C1, C2 may fill the metadata in the response frame such that the frames generated by multiple controllable devices C1, C2 can be considered as copies of the same frame. For example, the source address of the resource-constrained device RRD1 can be used as the source address of the response, rather than the source address of the individual controllable device C1, C2 (with cache) that sends the response.

If the resource-constrained device RRD1 happens to be operational, it may answer as well.

Preferably, there is a way to stop buffering the query message (the requesting message) for the sleeping resource-constrained devices, or even to decide not to buffer the query message at all, e.g. in cases where the query has a specified response time, and the time expires before the sensor (will) wake(s) up, or in case at least one controllable device C1, C2 did already respond, and/or in case the cache entry is still valid/fresh. For this purpose, for example, the controllable device C1, C2 (cache nodes) in group X can check the data in the buffered message, e.g. the network header source, destination and frame counter. If it is identical to the message just responded to/answerable by the controllable device C1, C2, the message could be dropped.

Step 5: Response is delivered to the requester/requesting device (the requesting http client device HC). The responses may need to be de-duplicated, e.g. the response from resource-constrained device RRD1 itself, if available, selected, or otherwise the freshest response is chosen. This can be done at the border router 6LBR, if involved, together with other processing steps, e.g. CoAP-HTTP protocol translation. It may also be performed by the requesting device itself.

Step 6: Optionally, (border router 6LBR on behalf of the) requesting device becomes member of the group X. The requesting device itself, and/or the border router 6LBR on behalf of one/multiple (external) http client requesters HC may become members of group X, especially if the requests are frequent or responses are time-critical, or there are many local controllable devices C1, C2 (comprising a cache) responding, making the response de-duplication resource-intensive. Advantage: the number and location of controllable devices C1, C2 with caches does not affect the resource-constrained device RRD1 in any way. So, adding an additional caching node in this way is not a problem.

Some variants of the above discussed network system and/or method are: i) during initialization: the solution is also applicable to a case where multiple controllable devices are controlled by the resource-constrained devices using other addressing modes, e.g. unicast. ii) The resource-constrained device is not a member of group X, thus the queries/requests from the requesting devices are never sent to it, but only to the controllable devices C1, C2 which comprise a cache. iii) The controllable devices C1, C2 with a cache, being member of the group X, and knowing the true identity/address of the resource-constrained device RRD1 (e.g. from their neighbor table), may locally decide to poll RRD1 for the current value. Such polling behavior may optionally be optimized by knowledge of the sleep schedule of resource-constrained device RRD1.

The above discussion mainly focuses on a request from the external http client HC. It may also be that one of the devices of 6LoWPAN network 6N is the requesting device which wants to obtain data which relates to the status of the resource-constrained device RRD1. For example, one of the devices R, C3 or RRD2 may be the requesting device. Such a device may first use the internal domain name system ID to find the multicast address of group X. As discussed previously, the internal DNS function ID may be fulfilled by the border router 6LBR. Subsequently, the device sends the request for the data of the resource-constrained device RRD1 directly to group X. Subsequently, one or more controllable devices C1, C2 with a cache (and, in specific situations, the resource-constrained device RRD1) may reply by sending the data.

In an additional scenario, it might be that a device, which is not one of the controllable devices C1, C2 and which is not a member of group X, wants to write data or information to the resource-constrained device. Hereinafter an exemplary embodiment of this situation is described.

This scenario focuses on a requesting device having a message which needs to reach the resource-constrained device RRD1 itself, e.g. because it is a request for not yet cached data, for one-time or henceforth reporting, or it is a write attempt to the resource-constrained device RRD1, e.g. to provide a parameter, change the reporting configuration, or even do a software upgrade on the constrained device.

Step 7: The requesting device needs to communicate to the resource-constrained device RRD1, performs the resolution as in step 2 (discussed above) and sends the request for communication to the resource-constrained device RRD1.

Step 8: At least one of the controllable devices C1, C2 that has a cache for storing data received from the resource-constrained device RRD1 caches the information which is intended to be communicated to the resource-constrained device RRD1.

The representation of particular resources in the discovery and caching process can be e.g. based on a resource-constrained device's pre-configuration, or on a commissioning-time decision. For example, a commissioning tool can send (a) configuration command(s), defining in which particular controllable device C1, C2 any information is to be cached that is destined for the resource-constrained device RRD1 (which/how many controllable devices RRD1), what to call it, how often to report, etc.

Pointers (e.g., CoRE link-format descriptions, such as, for example, discussed in RFC6690 as published by the Internet Engineering Task Force (IETF) and the Internet Society) to non-cached data, or generic pointers to the resource-constrained device RRD1, may be provided to selected controllable devices C1, C2 or to a discovery service, e.g. during a configuration process. Preferably, controllable devices C1, C2 with caches are selected intelligently, e.g. from among the controllable devices C1, C2 having most frequent contact with the resource-constrained device RRD1, or, for example, being physically closest to the resource-constrained device RRD1.

Option 1: The discovery mechanism has a way of pointing directly to the resource-constrained device RRD1 (and/or its parent/proxy) for direct communication. This may require the requesting device and/or the discovery mechanism to be able to differentiate between different request types. For example, the request for "occusensor-write.room65.floor1.HTC34.example.com" may be resolved to the sensor's IP address, while the request for "occusensor.room65.floor1.HTC34.example.com" may be resolved to the group address of the controllable devices C1, C2. It may be the discovery system entry or the routing mechanism that ensures that the unicast communication targeted to the resource-constrained device RRD1 will go via a parent/proxy node. The parent/proxy node is not necessarily controlled by the resource-constrained device RRD1—i.e. is not necessarily a controllable device C1, C2 which receives control data from the resource-constrained device RRD1. The parent/proxy node can be centralized, or can be in range of the resource-constrained device RRD1. The task of the parent/proxy node is to buffer the message intended for the resource-constrained device RRD1, preferably manage the queue of pending messages for each resource-constrained device RRD1, preferably also update the requesting device on the processing status, e.g. availability of buffer, expected delivery time, etc., preferably also de-duplicate the requests.

Option 2: The discovery mechanism may only allow for pointing to the controllable device C1, C2 with a cache for storing data from the resource-constrained device RRD1. It may point to a/any/some/all resource-constrained devices C1, C2, C3, including groups. It will then be the task of the resource-constrained device C1 . . . C3 to determine that it is not possible to answer the request for communication or provide specific data on the basis of data that is currently stored in the caches of the controllable device C1 . . . C3 and make sure the request is delivered to the resource-constrained device RRD1. Of course, controllable device C1 . . . C3 selection mechanisms as described in Step 4 above can be used to limit the number of controllable devices C1 . . . C3 (with caches) actively involved in this process.

Option 2A: there is a dedicated parent/proxy device per resource-constrained device. The controllable devices which cache the request for communication with the resource-constrained device RRD1 have to forward to the resource-constrained device RRD1 via its parent/proxy device; the discovery and/or the routing must then be configured to take care of this. Such a parent/proxy device, in addition to the tasks described in the paragraph above, would have to de-duplicate the messages that are potentially forwarded by multiple devices which cache the request for communication. Preferably, the messages allow for duplicate filtering at the lowest possible level, preferably based on the network-layer originator's address. Higher layer information may be used for de-duplication as well, but requires an additional code in the parent/proxy node. In addition, the resource-constrained device RRD1 should be capable of duplicate-filtering the received frames, to prevent that said frames are dealt with and responses are transmitted to them multiple times.

Option 2B: there is no "parent node"/there are no multiple "parent" nodes.

A/one/some of the controllable devices C1, C2 with a cache (i.e. the devices controlled by the resource-constrained device RRD1) will schedule forwarding the request directly to the resource-constrained device RRD1. The resource-constrained device RRD1 might ignore duplicated requests. The controllable device C1, C2 should, if possible, observe the traffic to/from the resource-constrained device RRD1. If they see the resource-constrained device RRD1 responding to a request, they must check their queues, and if they have a copy of the same request still scheduled for sending, they must drop it. To facilitate this, the controllable devices (with caches) may need to replace the true network originator address by the group address/anycast address. Alternatively, the resource-constrained device RRD1 may be configured to respond—irrespective of the actual requester address—to a/any group, and the group members being responsible for keeping track of pending queries (including. e.g. the requester's address) and then matching the responses.

Option 2C: Empty data creation at the controllable device C1, C2 in the cache. To request a resource-constrained device RRD1 to report data, the requesting device can create a hitherto non-existent data field once (e.g. in RESTful architecture terms, by making a PUT or a POST request which is addressed to the group X of controllable devices C1, C2 with caches, which create an empty resource). This can trigger the controllable device C1, C2 (with caches) to ask the resource-constrained device RRD1 for the corresponding data value indicated by the newly created data on the caches.

In case of a data query, the controllable device C1, C2 (with caches) can proactively create a data field/record to store the additional information related to the status of the resource-constrained device RRD1. The controllable device C1, C2 or parent/proxy nodes may need arbitration mechanisms in case the same data is written multiple times. The mechanisms can be pre-configured, or carried in the message. For example, in case of constrained memory, only the message that arrives first, or the freshest messages, can be stored in cache. There may be priority settings determining the importance of the packets. There may be packet lifetime indication, allowing dropping of expired packets. The controllable devices C1, C2, parent/proxy nodes may further need instruction for the case when the resource-constrained device reports a change of the data to-be-written changes before the value to be written is delivered to it. For example, role-based priority settings may arbitrate between the resource-constrained device RRD1 and e.g. a commissioning tool. The intelligence to deal with such situations may be on the side of the requesting device. This may require hardware or software in the requesting device to recall/cancel the packet, or indicate the intention of replacing a previous packet.

Optionally, controllable devices C1, C2, parent/proxy nodes confirm the buffering to the requesting device.

Step 9: Resource-constrained device RRD1 opens reception window by enabling the operational mode. The request is delivered to the resource-constrained device RRD1. It is assumed that the resource-constrained device RRD1 opens a reception window every now and then. The exact mechanisms of communicating the availability of the reception window (e.g. periodic polling, periodic listening, reception window for acknowledgement/response reception following a frame just transmitted or reception window announced in the frame transmitted by the resource-constrained device; with and without medium reservation) or triggering its opening (e.g. by some indication in the acknowledgement/response frame, poll response, or wake-up mechanisms) are known in the art. Similarly, security and access control mechanisms, if required, are known in the art. Some of those mechanisms are dictated by the exact communication protocol used, e.g. medium access control. In case of multiple controllable devices C1, C2, parent/proxy nodes, arbitration mechanisms, e.g. random delays, can be used to make sure that only one of the devices with a cache sends at any given moment in time. The delays can be provided by the medium access control, or higher up in the stack.

Devices with caches that do not actively participate in the delivery may act normally, e.g. if the reception window is triggered by a resource-constrained device's transmission, they may behave normally, e.g. send a response to the resource-constrained device, if required, and/or forward the message, if required. Alternatively, they may change their behavior to better facilitate the message delivery to the resource-constrained device RRD1, for example, refrain from sending the response and/or postpone the forwarding.

Optionally, the resource-constrained device RRD1 confirms receiving new data with an 'ok'. Optionally, controllable device C1, C2, parent/proxy nodes with a cache confirms the WRITE (optionally including the reception of 'ok' in previous step) to the requesting device.

Step 10: If required, the resource-constrained device RRD1 responds to the request. The resource-constrained device RRD1 analyzes the message received. It may de-duplicate the message or check security credentials, as known in the art. It may check if the request type and the addressed data can be supported. Preferably, it is clear from the request whether it is a one-time action (e.g. data query), or whether henceforth regular communication is required. Further, it may contain information on the report triggers/conditions (times, events, thresholds, etc.), what address it will be reported to, etc. Otherwise, the constrained device itself may decide. If the message is a write request, the resource-constrained device may store the received information, e.g. update a parameter value or create a new data field. It may modify its behavior, e.g. change reporting/polling frequency or open the reception window longer, e.g. if the write request is part of the software update. Optionally, the resource-constrained device RRD1 confirms the performed action, or reports the error number in case of failure to complete the action.

If the message is a data query, the constrained device prepares a response message. The response message may contain the characteristics of the reporting behavior for this resource, e.g. if it is one-time or henceforth continued reporting, what are the report triggers (times, events, thresholds, etc.), what address it will be reported to (including new group address assignment, if required), data lifetime/validity, reporting frequency, reporting jointly with another parameter, etc. The reporting characteristics may be those requested in the original query, or modified by the constrained device, according to its capabilities and needs.

The resource-constrained device RRD1 may address the response directly to the original requesting device if the address of this requesting device can be derived from the incoming request message. Alternatively, the resource-constrained device RRD1 may address the response to the controllable device C1, C2. Or alternatively, the resource-constrained device RRD1 just responds to the source address indicated in the network layer header of the request message. In the simplest embodiment, resource-constrained devices RRD1 just forward the response back to the original requesting device. In another embodiment, at least one/some/all of the devices with a cache may need to create a new data field to cache this data/information, or populate the data field created proactively in step 8. Those may be the devices with a cache selected from the group originally addressed by the requesting device/resource-constrained device, or other device with a cache, e.g. depending on the amount of parameters cached already on behalf of this resource-constrained device, the frequency of contact with this device, the joint resource reporting, etc. The device with a cache may need to update the discovery mechanism accordingly. A requesting device either waits for the response or makes a query request to the device with a cache in the way described previously. The requesting device can also choose to become a device with a cache for this parameter, and optionally it could request the resource-constrained device RRD1 to report any future changes in this parameter to itself.

In summary, the invention relates to a network system for and a method of caching information from a resource-constrained device. A resource-constrained device provides generated data that relates to a status of the resource-constrained device via a network to a controllable device for controlling the controllable device. The controllable device controls an operation of an operational component in response to receiving the data. The controllable device also comprises a cache memory in which the received data is stored and the controllable device is configured to receive from a requesting device a request for the stored data and is configured to provide the stored data to the requesting device. The network system provides a caching solution for the data which is more transparent for the resource-constrained device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A network system for caching information from a resource-constrained device, the network system comprising:
   a controllable device comprising a first communication interface and an operational component for performing a specific action on the basis of received data (d), the controllable device being configured to receive the data (d) via the first communication interface and to adapt the operation of the operational component in response to the received data (d),
   a resource-constrained device configured to enter a sleep mode on a regular basis during which the resource-constrained device is unable to communicate, the resource-constrained device comprising a sensor or switch, a second communication interface and a data generator for generating the data (d) relating to a status of the sensor or switch, the resource-constrained device being configured to transmit the data (d) via the second communication interface to the controllable device for controlling the operation of the controllable device,
   a network for connecting the controllable device and the resource-constrained device to each other and for transmitting the data (d) between their respective first and second communication interfaces, wherein
   the controllable device comprises a cache memory for storing the data (d) received from the resource-constrained device, and
   the controllable device is configured to store the data (d) received from the resource-constrained device in the cache memory, and it is configured to receive a request (r) for the data (d) stored in the cache memory from a requesting device, and it is configured to provide the data (d) to the requesting device.

2. The network system according to claim 1, wherein the data (d) relating to a status of the resource-constrained device is based on at least one of:
   information of the sensor of the resource-constrained device,
   information of the switch or a control element of the resource-constrained device,
   information relating to a low-battery status of the resource-constrained device or relating to errors of the resource-constrained device, for generating a signal at the controllable device.

3. The network system according to claim 1, further comprising:
   a further controllable device comprising a further communication interface and a further operational component for performing a specific action on the basis of the received data (d), the further controllable device being configured to receive the data (d) from the resource-constrained device and to adapt the operation of the further operational component in response to the received data (d), wherein
   the resource-constrained device is configured to transmit the data (d) also to the further controllable device,
   the further controllable device comprises a further cache memory for storing the data (d) received from the resource-constrained device, and
   the further controllable device is configured to store the data (d) received from the resource-constrained device in the further cache memory, and to receive the request (r) for the data (d) stored in the further cache memory from the requesting device and to provide the data (d) to the requesting device.

4. The network system according to claim 1, wherein
the controllable device, the resource-constrained device, and the further controllable device are provided with a network address and are configured to receive messages which are addressed to the network address via the network and
the network system comprises an address resolving function for storing a mapping between a name or an identifier of the resource-constrained device and a network address of at least one controllable device that has a cache memory for storing data (d) received from the resource-constrained device, the address resolving function being configured to provide the network address in response to receiving a request (rna) for providing the network address which is coupled to the name or the identifier of the resource-constrained device.

5. The network system according to claim 1, wherein
the controllable device, the resource-constrained device, and the further controllable device are provided with a network address, a name or an identifier and are configured to receive messages which are addressed to the network address, the name or the identifier, and the network system comprises a resource directory function for storing a mapping between specific resources provided by the resource-constrained device and a network address, a name or an identifier of at least one controllable device that has a cache memory for storing data (d) received from the resource-constrained device, the resource directory function being configured to provide the network address, the name or the identifier in response to receiving a request for providing the network address, the name or the identifier for a specific resource when the resource-constrained device provides the specific resource.

6. The network system according to claim 5, wherein
the network address is an individual network address or a network group address, wherein the individual network address uniquely identifies a single device of the network system and wherein the network group address is an address which belongs to a group of devices, the name is an individual name of a controllable device or a group name, wherein the individual name uniquely identifies a single device of the network system and wherein the group name belongs to a group of devices.

7. The network system according to claim 4, wherein
the address resolving function is provided by an address resolving device of the network system, the address resolving device being configured to perform the functions of the address resolving function, or the address resolving function is distributed among devices of the network system and the devices of the network system are configured to provide the address resolving function in cooperation with each other.

8. The network system according to claim 1, wherein
the resource-constrained device is configured to transmit further data (fd) via the second communication interface to the controllable device, wherein the further data (fd) also relates to the status of the resource-constrained device and does not directly control an action of the controllable device, and the controllable device is configured to store the further data (fd) in the cache memory and to provide the further data (fd) to the requesting device when a request (r) for the further data (fd) has been received by the controllable device.

9. The network according to claim 8, wherein the further data (fd) comprises one of:

power status of the resource-constrained device, energy status of the resource-constrained device, identifier of the resource-constrained device, capabilities of the resource-constrained device, configuration information of the resource-constrained device, freshness data, location information of the resource-constrained device, one or more error codes, one or more log entries, detection flag of physical intrusion on the resource-constrained device's hardware, manufacturer name/type/model/serial number, firmware version, network diagnostic information from the second communication interface, number of packets sent/received via the second communication interface, number or address of routing parents of the resource-constrained device, number or address of other controllable devices controlled by the resource-constrained device, measure of network congestion, status of selected inputs of input devices, status of selected control elements and/or sensors of the resource-constrained device.

10. The network system according to claim 1, wherein the cache memory is also configured to store other data (od) that must be provided to the resource-constrained device and the controllable device is configured to receive the other data (od) and to store the other data at least temporarily in the cache memory and to transmit the other data (od) to the resource-constrained device when the resource-constrained device is capable of receiving the other data (od).

11. The network system of claim 1, wherein the requesting device is part of a building management system configured to monitor the status of the sensor or switch of the resource-constrained device via the data (d) received from the cache memory of the controllable device in response to the request (r).

12. A method of caching information from a resource-constrained device in a network system, where the network system comprises a resource-constrained device and a controllable device, the method comprising the stages of:

generating data relating to a status of a sensor or switch of the resource-constrained device, transmitting the generated data from the resource-constrained device to the controllable device, regularly setting the resource-constrained device in a sleep mode in which the resource-constrained device is unable to communicate;

receiving the generated data at the controllable device, performing a specific action at the controllable device in response to the received data, storing the received data in a cache memory of the controllable device, receiving from a requesting device a request for the data stored in the cache memory, and providing to the requesting device data stored in the cache memory in response to a received request.

13. The method of caching information from a resource-constrained device in a network system according to claim 12, wherein a subset of the devices of the network system are provided with a network group address, and the network system comprises an address resolving function for storing a mapping between network group addresses of groups of devices and names of the respective devices of the group, the method comprising the stages of:

providing a network group address of a group to which the specific device belongs in response to receiving the request.

14. The method of claim 12, wherein the requesting device is part of a building management system and the method further comprises monitoring the status of the resource-constrained device with the building management system via the data received from the cache memory of the controllable device.

15. The method of claim 14, wherein the network system comprises a lighting system including a plurality of the controllable devices connected via a network, wherein each of the controllable devices comprises a light source and the performing includes controlling light emission of each light source.

16. A network system for caching information from a resource-constrained device, the network system comprising:

a resource-constrained device comprising a sensor or switch, a second communication interface and a data generator for generating a data (d) relating to a status of the sensor or switch, the resource-constrained device being configured to transmit the data (d) via the second communication interface to the controllable device for controlling the operation of the controllable device and to enter a sleep mode on a regular basis during which the resource-constrained device is unable to communicate;

a controllable device comprising a first communication interface, an operational component for performing a specific action, and a cache memory for storing the data (d), the controllable device being configured to receive the data (d) via the first communication interface and to adapt the operation of the operational component in response to the received data (d);

a building management system comprising a requesting device, the requesting device configured to send a request (r) for the data (d) stored in the cache memory of the controllable device; and a network connecting the resource-constrained device, the controllable device, and the requesting device to each other and configured to enable transmission of the data (d) and the request (r).

17. The network system according to claim 16, further comprising:

a lighting system including a plurality of the controllable devices connected to the network, wherein each of the controllable devices comprises a light source, and wherein the controllable devices are configured to control a light emission of each of the light sources in response to the reception of data (d) from the resource-constrained device.

18. The network system of claim 16, wherein the building management system comprises a central alarm system, the controllable device comprises an alarm, and the resource-constrained device comprises a smoke sensor, a motion sensor, a window opening sensor, or a combination including at least one of the foregoing.

19. The network system of claim 16, wherein the building management system comprises a climate management system, and the resource-constrained device comprises a sensor configured to measure a specific environmental parameter.

* * * * *